United States Patent
Guo et al.

(10) Patent No.: US 7,270,457 B2
(45) Date of Patent: Sep. 18, 2007

(54) LIGHT SOURCE DEVICE AND PROJECTOR USING THE SAME

(75) Inventors: Huang-Chen Guo, Kaohsiung County (TW); Chi-Xiang Tseng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/308,709

(22) Filed: Apr. 25, 2006

(65) Prior Publication Data

US 2007/0103927 A1    May 10, 2007

(30) Foreign Application Priority Data

Nov. 8, 2005  (TW) .............................. 94139058 A (51) Int. Cl.
*F21V 8/00* (2006.01)

(52) U.S. Cl. ...................... 362/555; 362/551; 362/560; 362/561

(58) Field of Classification Search ................ 362/551, 362/553, 555, 558, 559, 560, 561, 580, 582, 362/236, 800; 385/146

See application file for complete search history.

(56) References Cited

U.S. PATENT DOCUMENTS

| | | | |
|---|---|---|---|
| 6,956,701 B1 * | 10/2005 | Peterson et al. | 359/618 |
| 2003/0147055 A1 | 8/2003 | Yokoyama | 353/98 |
| 2006/0062013 A1 * | 3/2006 | Imade | 362/551 |
| 2006/0087861 A1 * | 4/2006 | Tessnow et al. | 362/538 |

FOREIGN PATENT DOCUMENTS

TW    0380123 B    1/2000

* cited by examiner

*Primary Examiner*—Laura Tso
(74) *Attorney, Agent, or Firm*—Jiang Chyun IP Office (57) ABSTRACT

A light source device and projector using the same is provided. The light source device includes multiple light source modules and a multi-channel optical light tube. The multi-channel optical light tube includes multiple channels, each of which has a light guiding portion and corresponds to one or more of the light source modules. The light source module transmits the output light to the corresponding light channel, and the light guiding portion of each light channel is provided with a reflective surface for combining the light input through the light channels to the multi-channel optical light tube, thus providing the output of the light source device.

20 Claims, 9 Drawing Sheets

LIGHT SOURCE DEVICE AND PROJECTOR USING THE SAME

CROSS-REFERENCE TO RELATED APPLICATION

This application claims the priority benefit of Taiwan application serial no. 94139058, filed on Nov. 8, 2005. All disclosure of the Taiwan application is incorporated herein by reference.

BACKGROUND OF THE INVENTION

1. Field of the Invention

Figure 1:
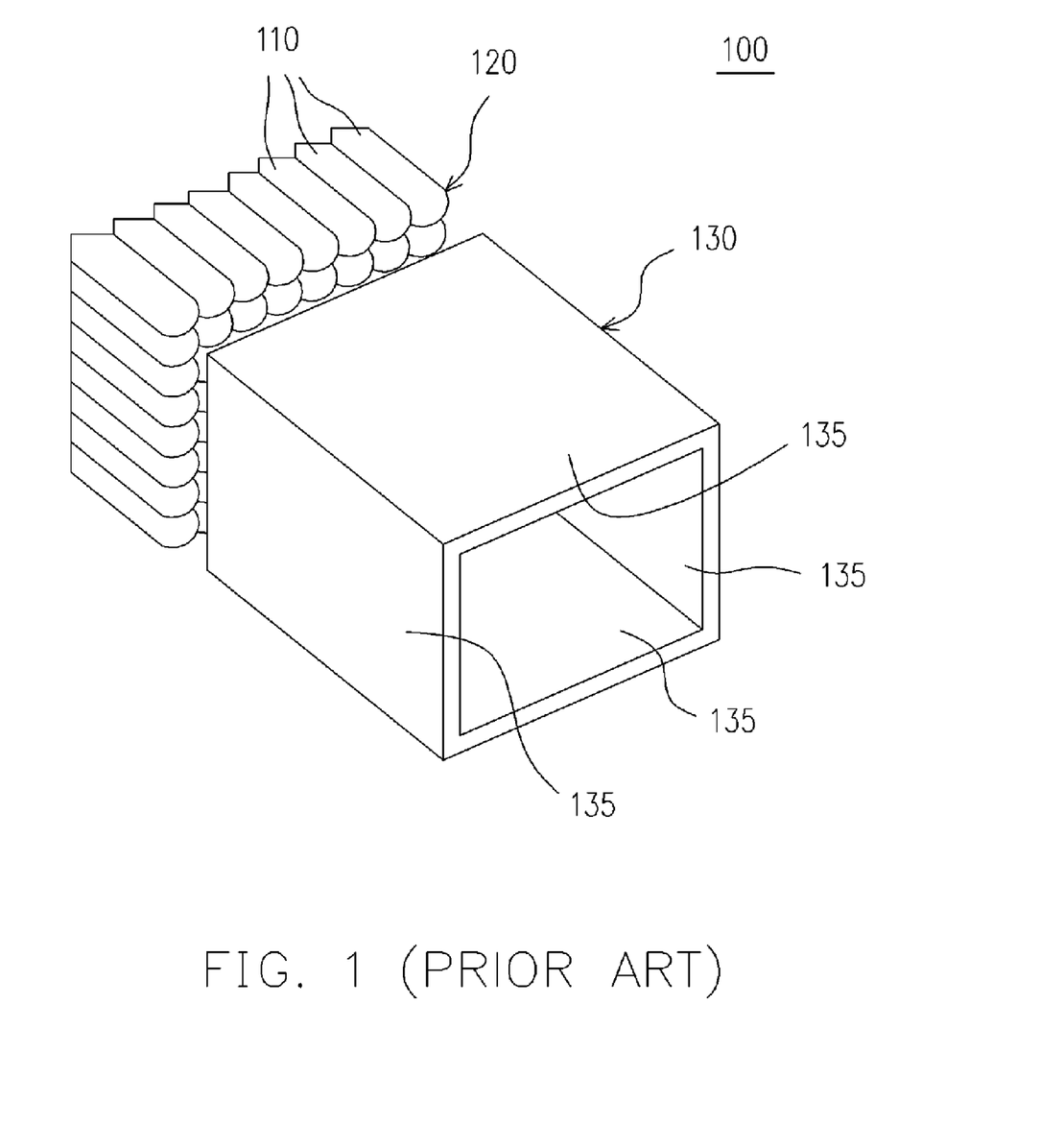
FIG. 1 is a schematic view illustrating arrangement of the LED of a conventional LED projector.
Figure 2A:
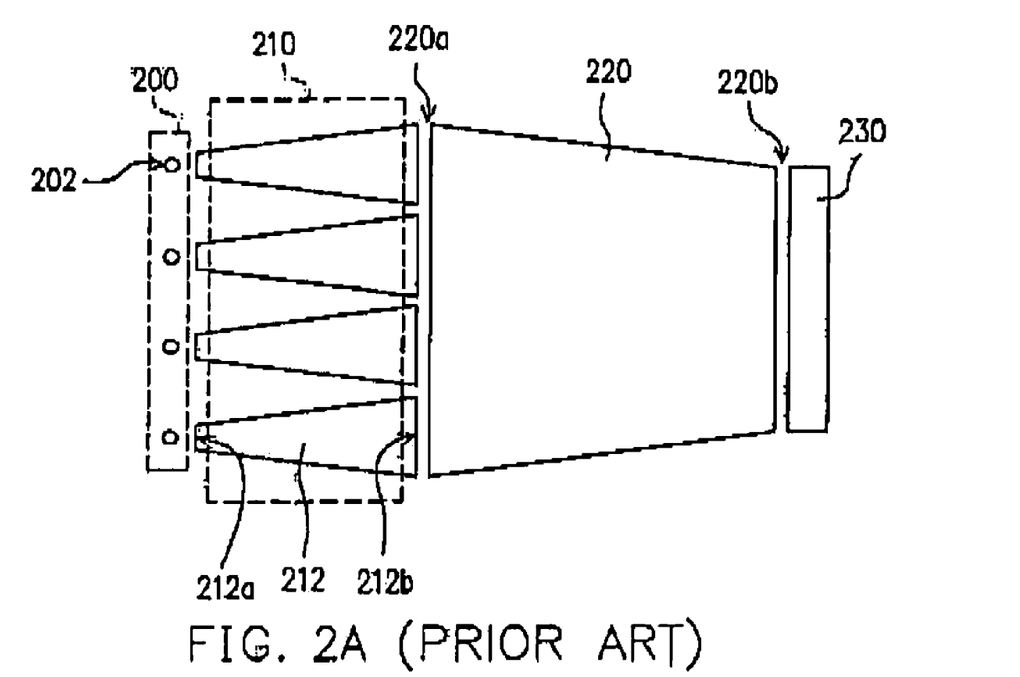
FIGS. 2A and 2B illustrates the light source device arranged in an array of the conventional light source.
Figure 2B:
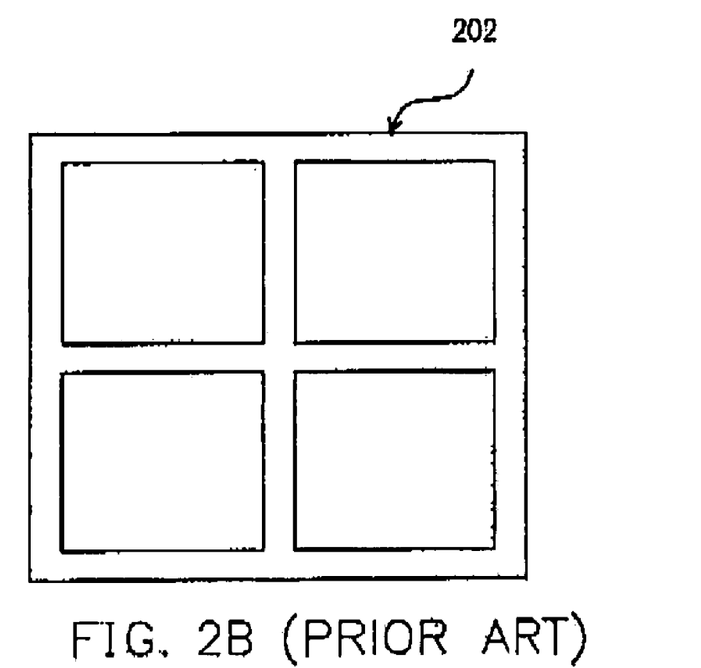

Furthermore, in the U.S. Pat. No. 6,318,863 of the same inventorship as the present invention, referring to FIGS. 2A and 2B, a light source device is arranged in an array. The light source device proposed includes a light source 200, an array of taper light pipes 210, a taper light pipe 220, and a light valve 230. The light source 200 is an array of multiple light emitting modules 202. The array of taper light pipe 210 is consisted of multiple light pipes 212. Each of the light pipes 212 has a first end 212a and a second end 212b. The first end 212a of each light pipe 212 is closely connected to each light emitting module to collect the large angular beam from each light emitting module and convert the light emitted by the light source 200 into small angular light. Thereby the uniform light is emitted from the second end 212b of each light pipes 212. The taper light pipe 220 has a first end 220a and a second end 220b. The first end 220a is used to receive the uniform light emitted from the array of taper light pipe 210 and then overlap the received light onto the light valve 230 uniformly. The structure can improve the luminance of the integral output light source.

2. Description of Related Art

Accordingly, the present invention is directed to provide a portable micro light source device, the volume of which is effectively reduced, thus presenting a better heat sinking effect and having a prolonged service life.

Furthermore, in the U.S. Pat. No. 6,318,863 of the same inventorship as the present invention, referring to FIGS. 2A and 2B, a light sources are arranged in an array. The light source device proposed includes a light source 200, an array of taper light pipes 210, a taper light pipe 220, and a light valve 230. The light source 200 is an array of multiple light emitting modules 202. The an array of taper light pipe 210 is consisted of multiple light pipes 212. Each of the light pipes 212 has a first end 212a and a second end 212b. The first end 212a of each light pipe 212 is closely connected to each light emitting module to collect the large angular beam from each light emitting module and convert the light emitted by the light source 200 into small angular light. Thereby the uniform light is emitted from the second end 212b of each light pipes 212. The taper light pipe 220 has a first end 220a and a second end 220b. The first end 220a is used to receive the uniform light emitted from the array of taper light pipe 210 and then overlap the received light onto the light valve 230 uniformly. The structure can improve the luminance of the integral output light source.

However, if the abovementioned light source device is applied in the micro light source device, particularly in the portable micro projector, it is too large to be miniaturized. Additionally, the problem of heat sinking is not easy to be solved, thus reducing the service life of the light source.

SUMMARY OF THE INVENTION

Accordingly, the present invention is directed to provide a portable micro light source device, the volume of which is effectively reduced, thus presenting a better heat sinking effect and having an prolonged service life.

An embodiment of the light source device proposed by the present invention includes multiple light source modules and a multi-channel optical light tube. The multi-channel optical light tube includes multiple channels, each of which has a light guiding portion and corresponds to one or more of the light source modules. The light source module transmits the output light to the corresponding light channel, and the light guiding portion of each light channel is provided with a reflective surface for combining the light input through the light channels to the multi-channel optical light tube, thus providing the output of the light source device.

The abovementioned light source device further includes a lens group for refracting or scattering the light output by the multi-channel optical light tube.

For the abovementioned light source device, the total area of the luminous flux of the light channels equals to the area of the luminous flux within the multi-channel optical light tube.

In the abovementioned light source device, the surface of the light guiding portion is designed as a curved face or an arc face.

In the abovementioned light source device, the light source modules provide different light source combinations to adjust the components of the light emitted by the light source device.

In the abovementioned light source device, the LED light source modules is an array of multiple red (R), green (G), and blue (B) LEDs, or an array of multiple single-color or white LEDs.

In the abovementioned light source device, the light source modules are Organic Light Emitting Diode (OLED) light source modules, Laser Diode light source modules, Electro-luminescence Device light source modules, Field Emission Display light source modules or Cold Cathode Fluorescence Lamp light source modules.

In the abovementioned light source device, the multi-channel optical light tube includes a heat dissipation fin for heat sinking.

The projector in one embodiment of the present invention includes a light source device and an image generating module. The light source device includes multiple light source modules and a multi-channel optical light tube. The multi-channel optical light tube includes multiple channels, each of which has a light guiding portion and corresponds to one or more of the light source modules. The light source module transmits the output light to the corresponding light channel, and each light guiding portion of each light channel is provided with a reflective surface for combining the light input through the light channels to the multi-channel optical light tube, thus providing the output of the light source device. The image generating module generates a corresponding image with the light produced by the light source device, based upon an image signal source.

The abovementioned projector further includes a heat-sink device, wherein the light source device dissipates heat through the heat-sink device.

The abovementioned projector is a LCD projector device, a single-panel or three-panel Liquid Crystal on Silicon (LCOS) projector device, or a Digital Light Processing (DLP) projector device.

In order to the make the aforementioned and other objects, features and advantages of the present invention comprehensible, a preferred embodiment accompanied with figures is described in detail below.

DESCRIPTION OF EMBODIMENTS

The present invention discloses a uniform light source device and a projector, which employs several light sources to achieve both uniform light and mixed light effects through the multi-channel optical light tube and the light source lens group. In addition, the area for heat sinking can be greatly expanded by using the ring-shaped and spherical light source distribution technique in the heat sinking region of the light source device, and the effect of heat sinking can be further improved by applying the heat conduction mechanism to the housing, thereby prolonging the service life of the light source. The light source device and projector can be applied to a variety of micro imaging panels, such as the Liquid Crystal Display (LED), Liquid Crystal on Silicon (LCOS) panel, and the Digital Light Processing (DLP).

The light source described above is, for example, a Light Emitting Diode (LED), an Organic Light Emitting Diode (OLED), a Laser Diode (LD), an Electro-luminescence Device (EL), a Field Emission Display (FED) or a Cold Cathode Fluorescence Lamp (CCFL) or the like. Each of the channel optical light tubes can be applied with one light source, or a plurality of light sources, according to design desired. In addition, if the plurality of light sources are implemented herein, an arrangement of the light sources can also be configured for performance.

To detail the features of the present invention, the application of the LED projector in an embodiment below is taken for the purpose of illustration, but it does not mean that the present invention is limited to the light source device and projector of the LED.

Figure 3A:
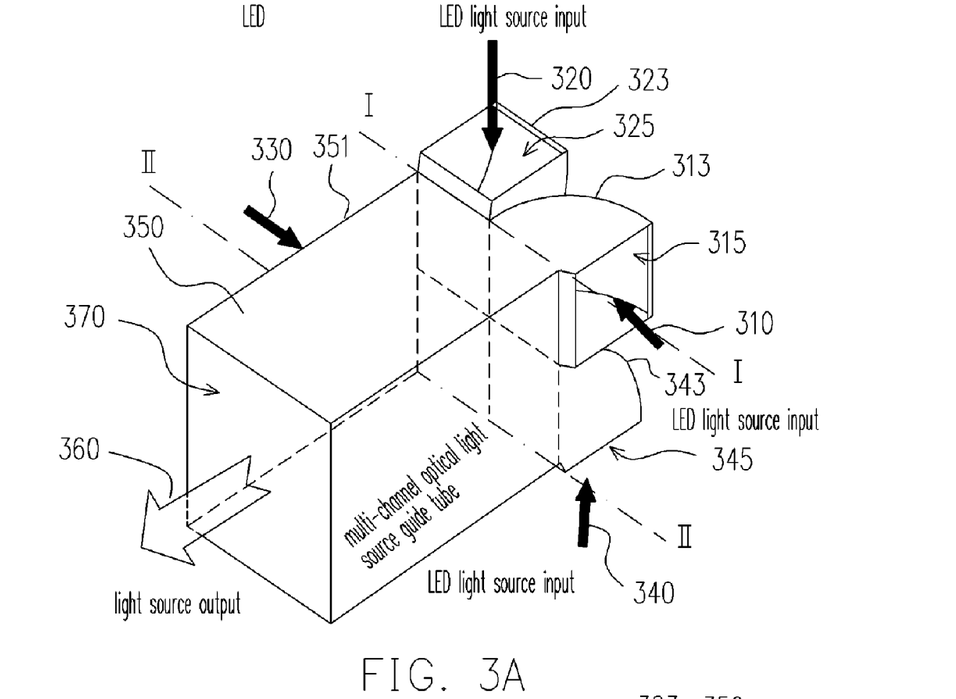
FIG. 3A illustrates a light source device applied in the LED projector in one embodiment of the present invention.
Figure 3B:
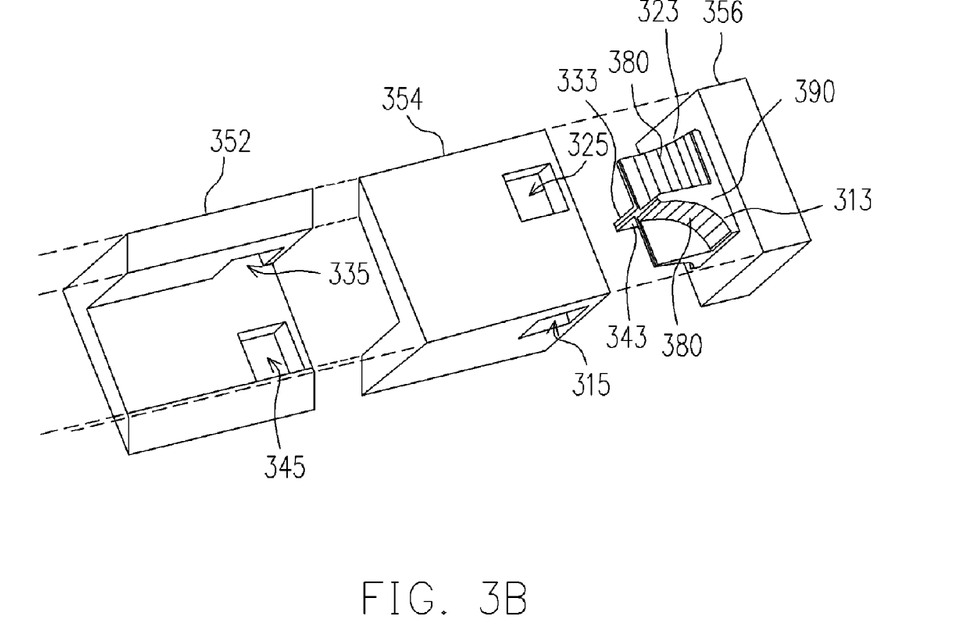
FIG. 3B is a schematic view illustrating the components of the light source device of the LED projector according to the preferred embodiments of FIG. 3A.

Referring to FIG. 3A, it shows a light source device applied in the LED projector in one embodiment of the present invention. FIG. 3B is a schematic view illustrating the components of the light source device of the LED projector according to a preferred embodiment in FIG. 3A. The embodiment of the present invention is illustrated according to FIGS. 3A and 3B. In the multi-channel light source device of the present invention, lights of the multiple small channels are collected and then combined into the total light of a large light through tube, thus achieving uniform and mixed light effects at the same time.

Firstly, different LED lights, such as the LED light source inputs 310, 320, 330, and 340 in FIG. 3A, are input to the multi-channel optical light guide tube 350 via input holes 315, 325, 335, and 345 respectively. The input hole 335 is shown in FIG. 3B. The total cross-section area of the input holes 315, 325, 335, and 345 is equal to or approximate to the area of the cross section between Line I-I and Line II-II of the body 351 of the multi-channel optical light guide tube 350. Of course, in an alternative embodiment, it is unnecessary that the total cross-section area of the input holes 315, 325, 335, and 345 equals to the area of the cross section of the guide tube body 351 of the multi-channel optical light guide tube 350, as long as a proper adjustment is made.

After being input through the input holes 315, 325, 335, and 345 respectively, lights from the LED light source inputs 310, 320, 330, and 340 are reflected to the interior of the guide tube body 351 of the multi-channel optical light source guide tube 350, through light channels respectively formed by light guiding portions 313, 323, 333, and 343, and then an uniform and mixed light 360 is output via an output hole 370. In one embodiment, the LED light source inputs can be applied with one LED light source, or a plurality of LED light sources, according to design desired. In addition, if the plurality of LED light sources are implemented herein, an arrangement of the LED light sources can also be configured for performance. According to an optical invariance principle, a total area of luminous flux of the light channels formed by the light guiding portions 313, 323, 333, and 343 equals to an area of luminous flux of a light guiding portion formed by the guide tube body 351. The light guiding portions 313, 323, 333, and 343 are designed as curved faces or arc faces. A light reflective surface 380 is provided inside the curved face or the arc face of each light guiding portion 313, 323, 333 or 343. The light reflective surface 380 is formed by, for example, coating a layer of silver or other materials having reflective effect on the surface, for reflecting the incident light.

Figure 4A:
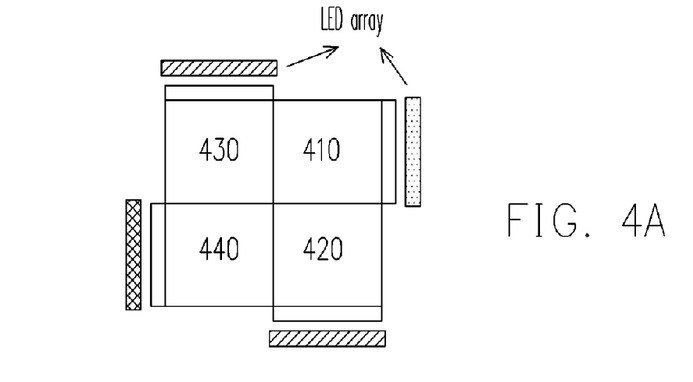
FIG. 4A is a schematic view illustrating the combinations of light source received in the light through tube inside the body of the optical light tube at the cross section between the Line I-I and Line II-II in FIG. 3A.
Figure 4B:
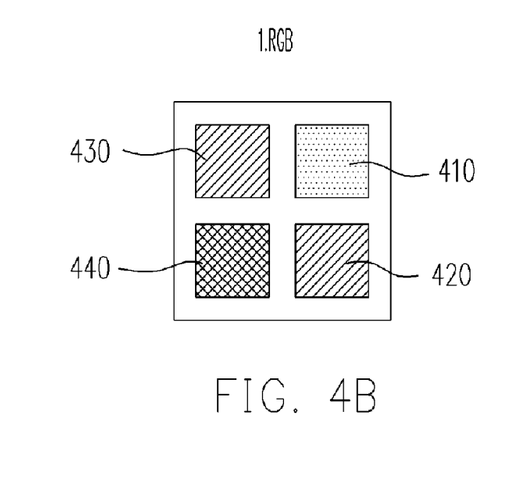
FIGS. 4B, 4C, and 4D illustrate the components of the light from different light channels in the cross section of FIG. 4A.
Figure 4C:
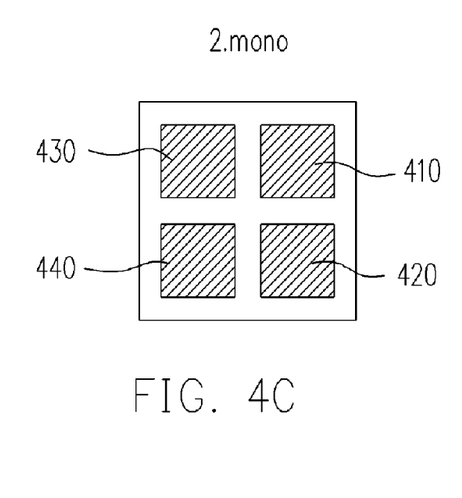
Figure 4D:
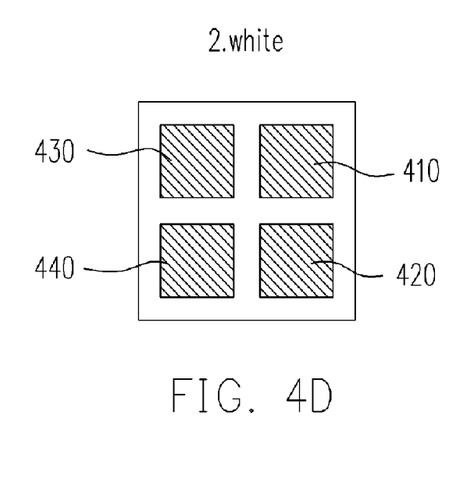

If the light source required by the projector is the three primary colors (i.e. red, green and blue, respectively denoted as "R", "G" and "B", hereinafter), the light source can be divided as RGGB, i.e. the light entering the position 410 is set to be red, and the light entering the positions 420 and 430 is set to be green, and the light entering the position 440 is set to be blue, as shown in FIG. 4B. Of course, the arrangement of the colors of the incoming light can be modified according to the required application, but is not limited thereto. Assuming that the light source required by the projector is mono, the light at the positions 410-440 is set to be the mono light, as shown in FIG. 4C. Assuming that the light source required by the projector is white, the light at the positions 410-440 is set to he white, as shown in FIG. 4D. For the light source device proposed by the present invention, the light source can employ the LED modules that include the combinations of several R, G, B or other color LEDs, or an array of mono LED, or the like. With such design, the electronic device of the light source device of the present invention, such as the projector, can provide light sources of different characteristics as desired.

In addition, the multi-channel optical light guide tube 350 can also be connected to a heat conduction or heat-sink device that is an original heat dissipation structure of the LED light source, or an additional heat dissipation fin for increasing the heat sinking area and the heat sinking efficiency. In an alternative embodiment, a fan is further used to control the heat flow, facilitating the overall heat sinking effect.

For the light source device applied in the LED projector according to the embodiment of the present invention, a portion of the uniform and mixed light effects is shown in FIG. 4A that is a schematic view illustrating the combinations of the light source received in the light through tube inside the guide tube body 351 of the multi-channel optical light guide tube 350 at the cross section between Lines I-I and II-II in FIG. 3A. Herein, it is assumed that the light introduced by the light guiding portions 313, 323, 333, and 343 are positioned at positions 410, 420, 430, and 440 respectively, in which the light is provided by different LED light sources. The design of different LED light sources proposed by the present invention refers to disposing the LED light sources at different positions rather than disposing together at the same position as the conventional art, such that a heat sinking mechanism is formed, thus prolonging the service life of the LED greatly and improving the overall light emitting efficiency. Moreover, based upon the demand for miniaturization, the volume of the LED light emitting modules can be controlled more efficiently to fit the portable micro projector.

If the light source required by the projector is the three primary colors (i.e. red, green and blue, respectively denoted as "R", "G" and "B", hereinafter), the light source can be divided as RGGB, i.e. the light entering the position 410 is set to be red, and the light entering the positions 420 and 430 is set to be green, and the light entering the position 440 is set to be blue, as shown in FIG. 4B. Of course, the arrangement of the colors of the incoming light can be modified according to the required application, but is not limited thereto. Assuming that the light source required by the projector is mono, the light at the positions 410-440 is set to be the mono light, as shown in FIG. 4B. Assuming that the light source required by the projector is white, the light at the positions 410-440 is set to be white, as shown in FIG. 4C. For the light source device proposed by the present invention, the light source can employ the LED modules that include the combinations of several R, G, B or other color LEDs, or an array of mono LED, or the like. With such design, the electronic device of the light source device of the present invention, such as the projector, can provide light sources of different characteristics as desired.

Figure 5:
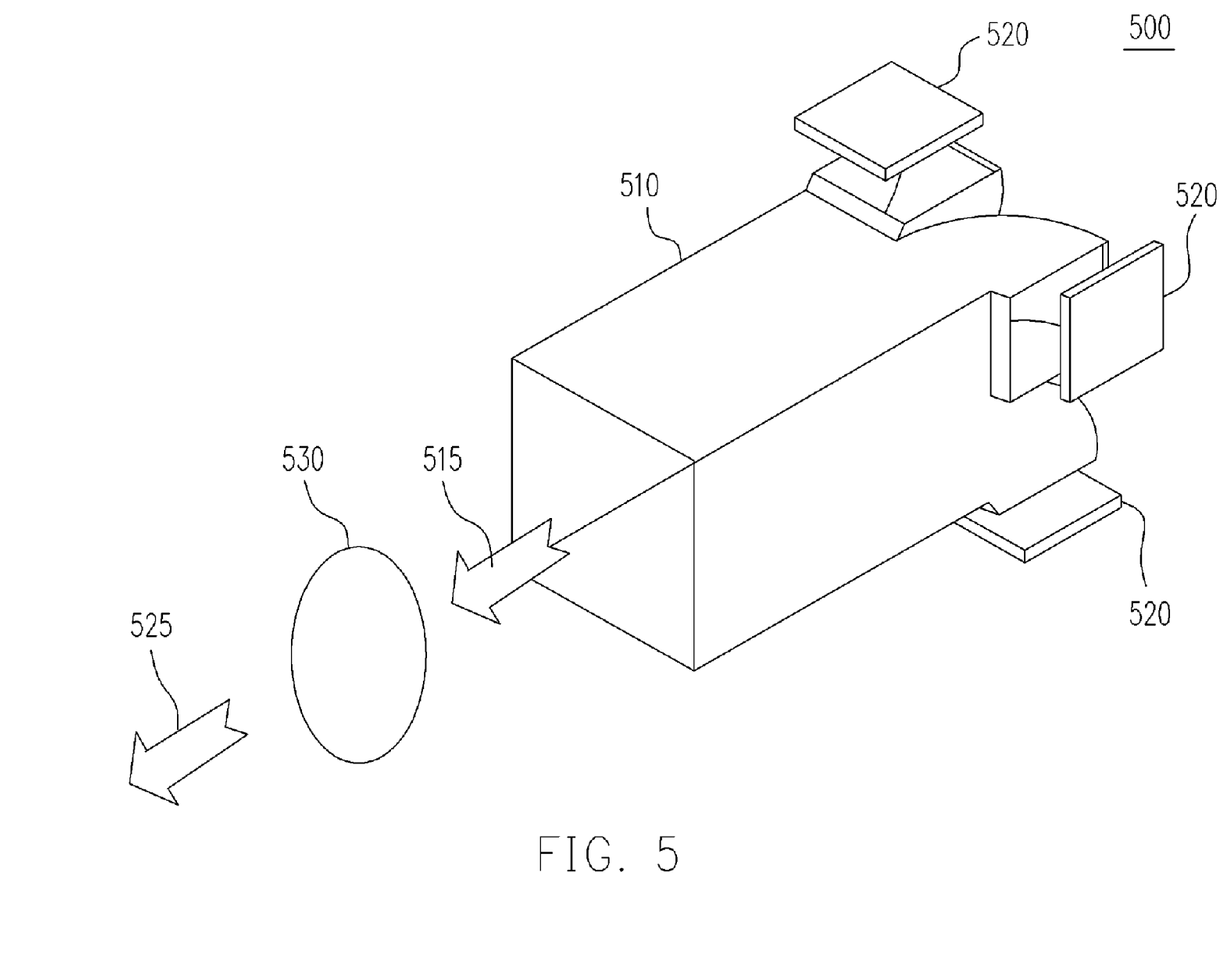
FIG. 5 illustrates a light source device applied in the LED projector according to the embodiments of the present invention.

Referring to FIG. 5, the light source device for the LED projector of the present embodiment is the LED light source device 500 mainly including the LED array 520 associated with the small channels, a multi-channel optical light guide tube 510 and a lens unit 530. The present embodiment employs the LED array to produce a desired light source. However, it is known to those skilled in the art that the light source can be replaced by any light source which can produce the desired light. The joining relation between the LED array 520 and the corresponding small channel formed by the light guiding portions can be close connection or separated by a small pitch depending on the requirement of the application. The light 515 emitted by the multi-channel optical light guide tube 510 has the uniform and mixed light effect, and can be converted into the desired beam 525 through the lens unit 530.

Figure 7A:
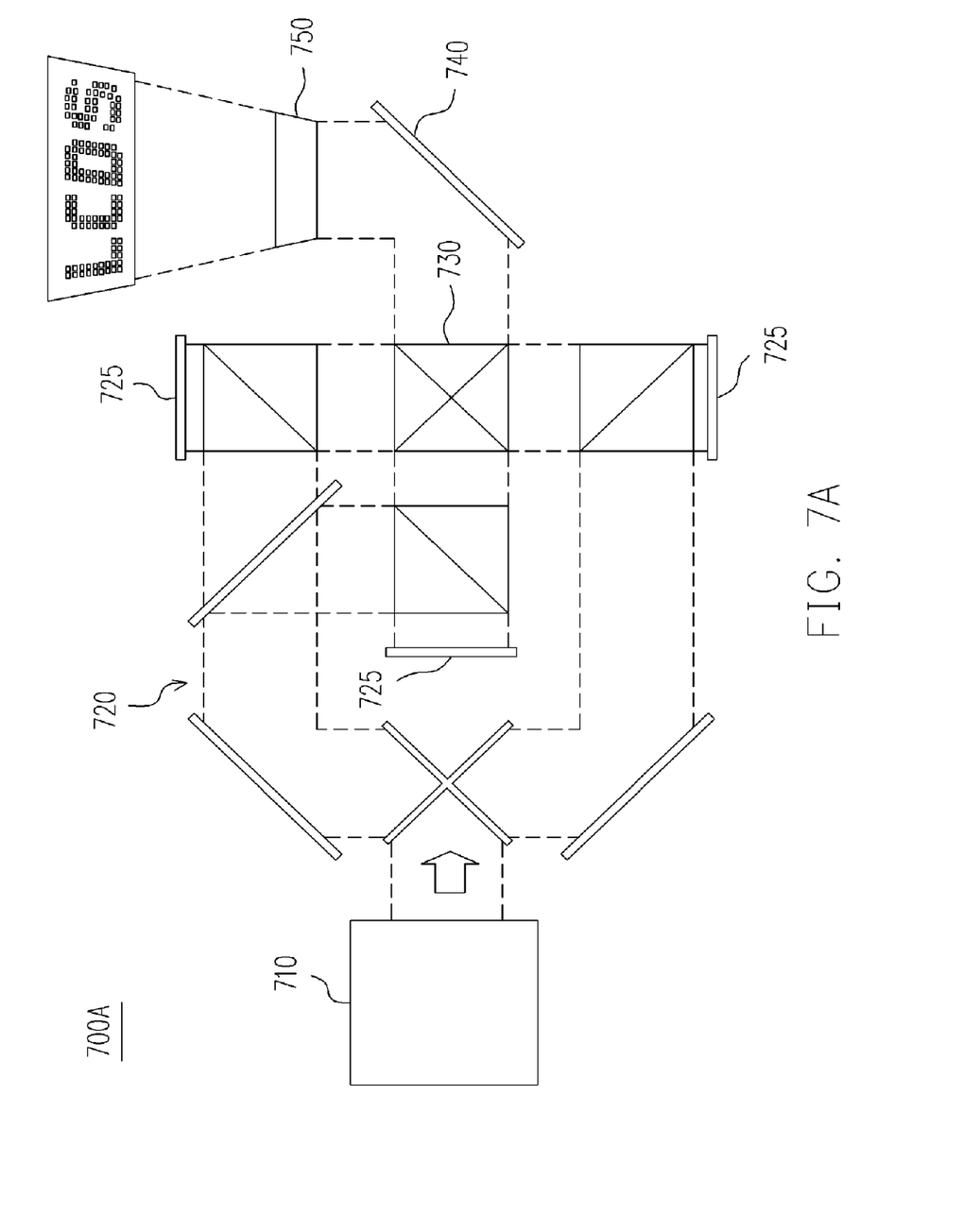
FIG. 7A illustrates a LCOS projector device with three LCOS panels employing the light source device of the preferred embodiment of the present invention.
Figure 7B:
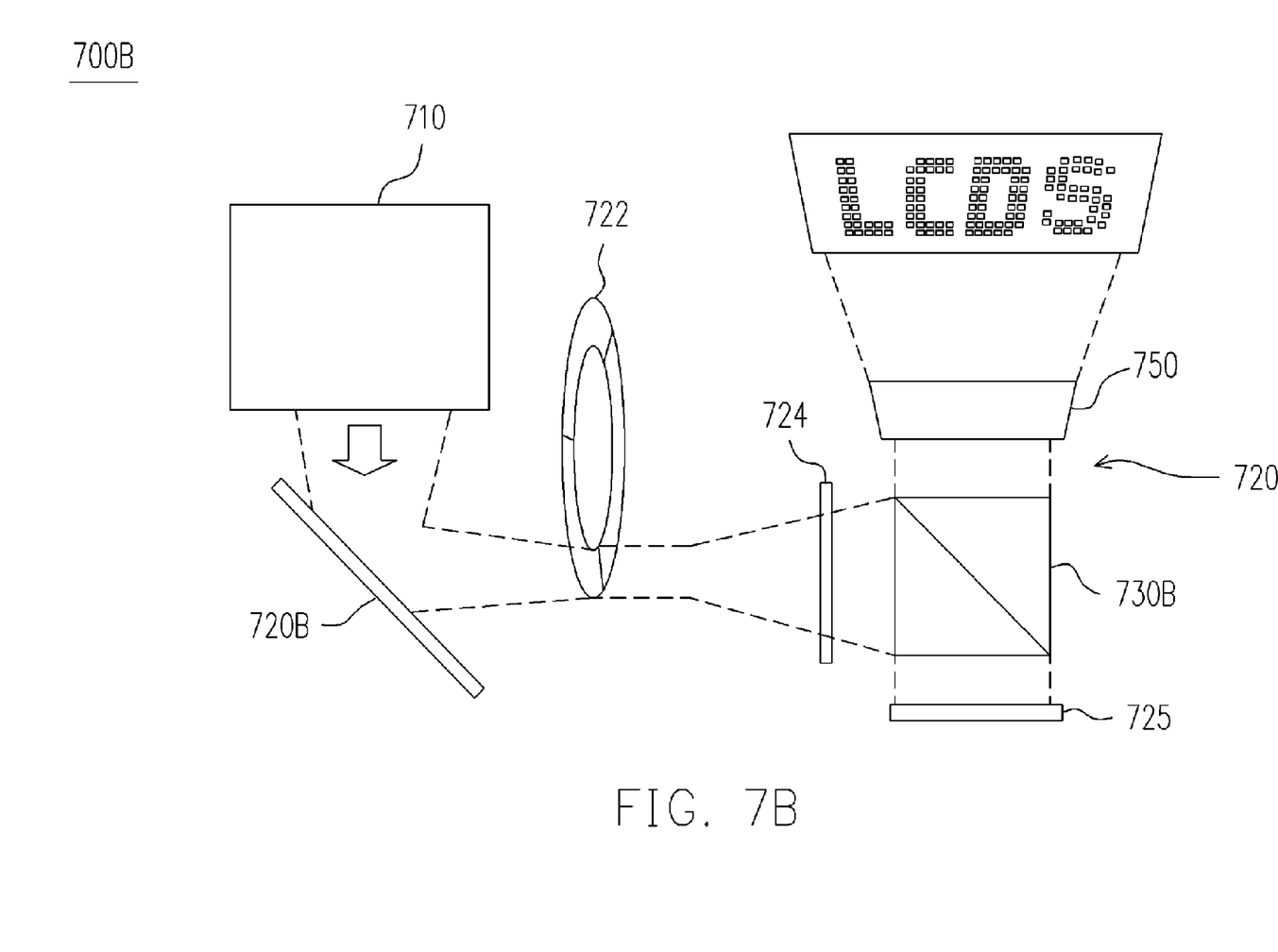
FIG. 7B illustrates a LCOS projector device with single LCOS panel employing the light source device of the preferred embodiment of the present invention.

Referring to FIG. 7B, it is a schematic view mainly illustrating the LCOS projector device 700B employing the light source devise of the preferred embodiment of the present invention. The LCOS projector devise 700B has a single LCOS panel 725 and uses the light source device of the present invention. The light source of the light source device 710 is, for example, a LED light source. The incoming light is reflected by the reflective lens 720B to the color drum wheel 722 having multiple different filtering regions. As such, the incident light can contact the filtering regions in different positions through the rotation of the color drum wheel 722, so that the three primary colors(red, green and blue) can be separated. And then the separated lights transmitted to the corresponding LCOS panel 725 through the polarizing plate 724 and the polarizing beam splitter 730B. Subsequently, the produced full-color image passing through the polarizing beam splitter 730B is finally transmitted to the display screen via the projecting lens 750.

The present invention is illustrated by taking the projector of the light source device of the present invention as an example, but is not limited to it.

Figure 6:
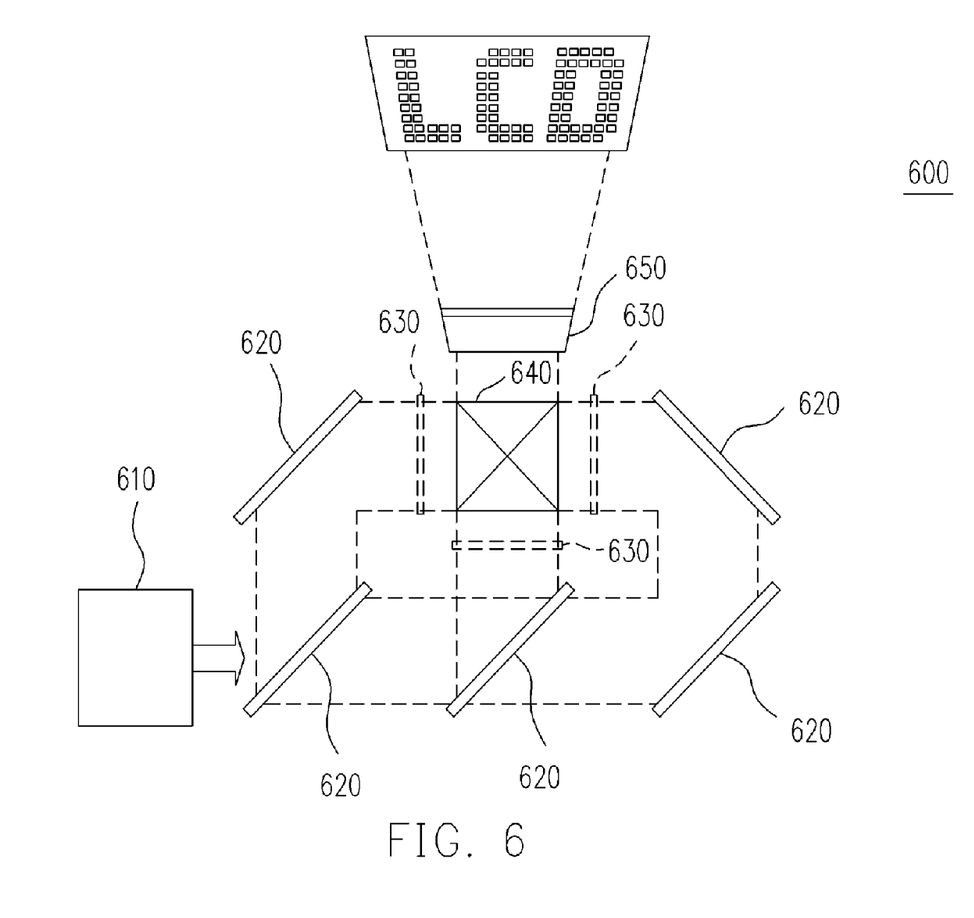
FIG. 6 illustrates a LCD projector device employing the light source device of the preferred embodiment of the present invention.

Referring to FIG. 6, it is a schematic view mainly illustrating the LCD projector device 600 employing the light source device of the preferred embodiment of the present invention. The LCD projector device 600 employs the light source device 610 of the present invention, and the light source of the light source device 610 is, for example, a LED light source. The three primary colors (red, green and blue) can be separated when the incoming light passes through a dichroic mirror 620, and then transmitted to the corresponding LCD panel 630. Subsequently, after combining the produced three-primary-color image through the combining prism 640, a full-color image is generated and then transmitted to the display screen via the projecting lens 650.

Referring to FIG. 7A, it is a schematic view mainly illustrating the LCOS projector device 700A employing the light source device of the preferred embodiment of the present invention. The LCOS projector device 700A has three LCOS panels 725 and employs the light source device 710 of the present invention. The light source of the light source device 710 is, for example, a LED light source. The three primary colors (red, green and blue) can be separated, and then transmitted to the corresponding LCOS panel 725 when the incoming light passes through several dichroic mirror groups 720. Subsequently, after combining the produced three-primary-color image through the combining prism 730, a full-color image is generated and then transmitted to the display screen through the reflective lens 740 and the projecting lens 750.

Referring to FIG. 7B, it is a schematic view mainly illustrating the LCOS projector device 700A employing the light source device of the preferred embodiment of the present invention. The LCOS projector device 700A has a single LCOS panel 725 and uses the light source device 710 of the present invention. The light source of the light source device 710 is, for example, a LED light source. The incoming light is reflected by the reflective lens 720B to the color drum wheel 722 having multiple different filtering regions. As such, the incident light can contact the filtering regions in different positions through the rotation of the color drum wheel 722, so that the three primary colors(red, green and blue) can be separated. And then the separated lights are transmitted to the corresponding LCOS panel 725 through the polarizing plate 724 and the polarizing beam splitter 730B. Subsequently, the produced full-color image passing through the polarizing beam splitter 730B is finally transmitted to the display screen via the projecting lens 750.

Figure 8:
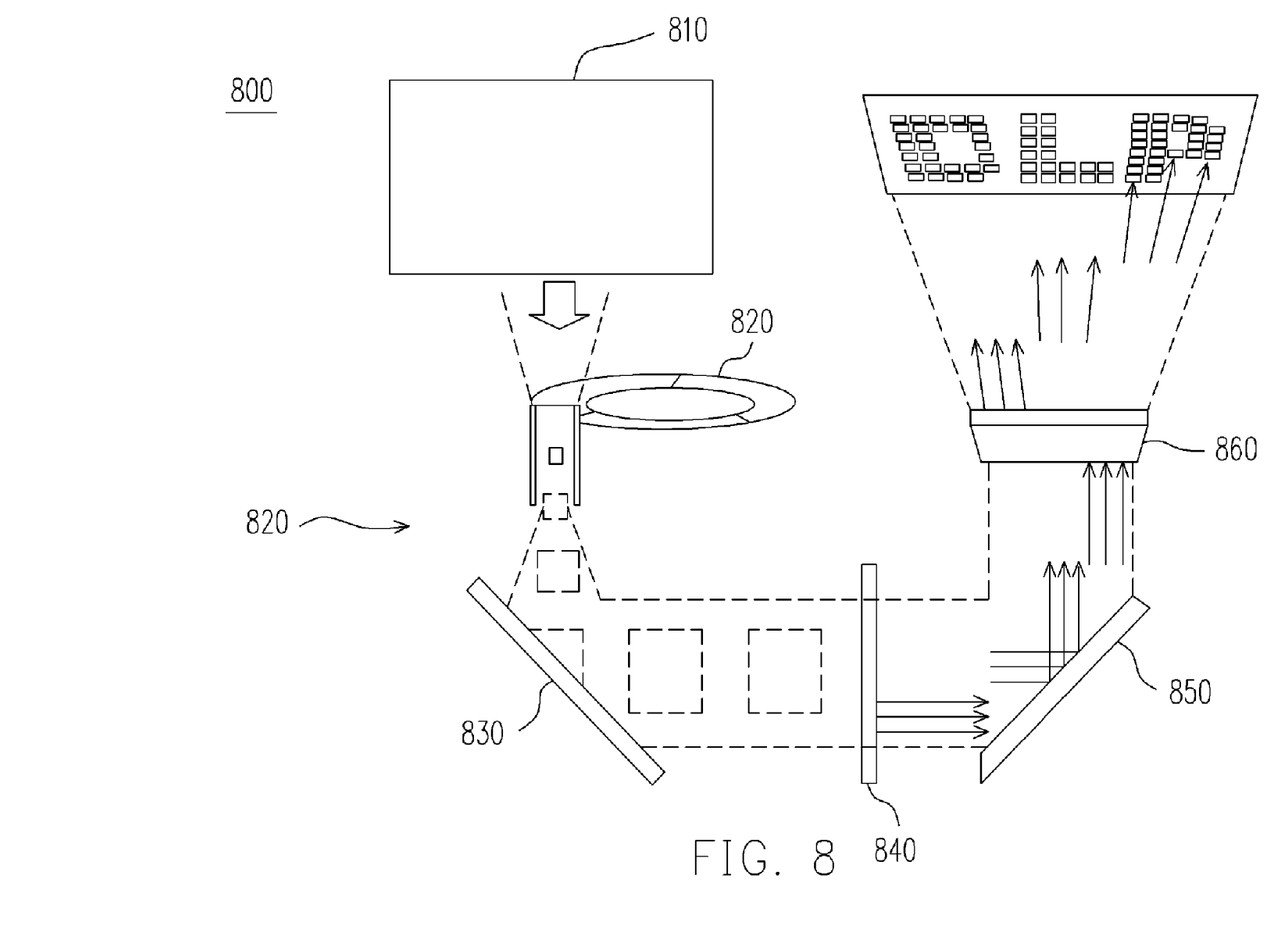
FIG. 8 illustrates a DLP projector device employing the light source device of the preferred embodiment of the present invention.

Referring to FIG. 8, it is a schematic block diagram mainly illustrating the DLP projector device 800 employing the light source device of the preferred embodiment of the present invention. The DLP projector device 800 has a Digital Micro-Mirror Device (DMD) 850, and employs the light source device 810 of the present invention. The light source of the light source device 810 is, for example, a LED light source.

The incoming light passes through the color wheel 820 having multiple different filtering regions at first. As such, the incident light can contact the filtering regions in different positions through the rotation of the color wheel 820, so that the three primary colors (red, green and blue) can be separated. And then, after passing through the reflective lens 830 and the polarizing plate 840 and being transmitted to the DMD 850, the separated light are transmitted to the projecting lens 860 and then to the display screen after going through a digital optical processing.

The light source device and the projector disclosed by the present invention can be used to achieve the uniform light and mixed light effects, by several light sources passing through the multi-channel optical light tube and the light source lens groups. Additionally, the area for heat sinking can be greatly expanded by applying the light source distribution technique to the heat sinking region of the light source device, and the effect of heat sinking can be further improved by applying the heat conduction mechanism to the housing, thus prolonging the service life of the light source device.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A light source device, comprising:
a plurality of light source modules configured for outputting light; and
a multi-channel optical light guide tube having a plurality of light channels and a plurality of holes communicating with the channels respectively, each of the light channels having a light guiding portion and corresponding to one of the light source modules, wherein the light source module transmits the output light to the corresponding light channel via the corresponding hole, and the light guiding portion of each of the light channels is provided with a reflective surface for combining the light input through the light channels to the multi-channel optical light guide tube, thus providing the output of the light source device.

2. The light source device as claimed in claim 1, further comprising a lens group for refracting or scattering the light output by the multi-channel optical light guide tube.

3. The light source device as claimed in claim 1, wherein a total area of luminous flux of the light channels equals to an area of the luminous flux within the multi-channel optical light guide tube.

4. The light source device as claimed in claim 1, wherein the surface of the light guiding portion is a curved face.

5. The light source device as claimed in claim 1, wherein the surface of the light guiding portion is an arc face.

6. The light source device as claimed in claim 1, wherein the light source modules provide different light source combinations to adjust components of the light output by the light source device.

7. The light source device as claimed in claim 1, wherein the light source modules are light emitting diode (LED) light source modules.

8. The light source device as claimed in claim 7, wherein the LED light source modules comprise an array of a plurality of red (R), green (G) and blue (B) LEDs.

9. The light source device as claimed in claim 7, wherein the LED light source modules comprise an array of a plurality of single-color LEDs.

10. The light source device as claimed in claim 7, wherein the LED light source modules comprise an array of a plurality of white LEDs.

11. The light source device as claimed in claim 1, wherein the light source modules are Organic Light Emitting Diode light source modules, Laser Diode light source modules, Electro-luminescence Device light source modules, Field Emission Display light source modules or Cold Cathode Fluorescence Lamp light source modules.

12. A projector, comprising a light source device, the light source device comprising:
a plurality of light source modules configured for outputting light; and
a multi-channel optical light tube having a body and a plurality of hollow light channels surrounded by the body, each of the light channels having a light guiding portion and corresponding to one or mare of the light source modules, wherein the light source module transmits the output light to the corresponding light channel, and the light guiding portion of each of the light channels is provided with a curved reflective surface for combining the light input through the light channels to the multi-channel optical light tube, thus providing the output of the light source device; and
an image generating module for generating a corresponding image with the light produced by the light source device, based upon an image signal source.

13. The projector as claimed in claim 12, wherein the light source modules are LED light source modules.

14. The projector as claimed in claim 12, wherein the projector is a liquid crystal display (LCD) projector device.

15. The projector as claimed in claim 12, wherein the projector is a liquid crystal on silicon (LCOS) projector device having a single LCOS panel.

16. The projector as claimed in claim 12, wherein the projector is a liquid crystal on silicon (LCOS) projector having three LCOS panels.

17. The projector as claimed in claim 12, wherein the projector is a digital light processing (DLP) projector device.

18. A light source device, comprising:
a plurality of light source modules configured for outputting light; and
a multi-channel optical light guide tube having a body and a plurality of channels surrounded by the body which defines a plurality holes communicating with the channels respectively, each of the light channels having a light guiding portion and corresponding to at least one of the light source modules, wherein the at least one light source module transmits the output light to the corresponding light channel via the corresponding hole, and the light guiding portion of each of the light channel is provided with a curved reflective surface for combining the light input through the light channels to the multi-channel optical light guide tube, thus providing the output of the light source device.

19. The light source device as claimed in claim 18, further comprising a lens group for refracting or scattering the light output by the multi-channel optical light guide tube.

20. The light source device as claimed in claim 18, wherein a total area of luminous flux of the light channels equals to an area of the luminous flux within the multi-channel optical light guide tube.

* * * * *